US010665878B2

(12) United States Patent
Morita et al.

(10) Patent No.: US 10,665,878 B2
(45) Date of Patent: May 26, 2020

(54) FUEL CELL SYSTEM

(71) Applicant: Panasonic Intellectual Property Management Co., Ltd., Osaka (JP)

(72) Inventors: Junji Morita, Kyoto (JP); Akinori Yukimasa, Nara (JP); Takehiko Ise, Osaka (JP); Miki Abe, Osaka (JP); Yoshito Usuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 146 days.

(21) Appl. No.: 15/937,938

(22) Filed: Mar. 28, 2018

(65) Prior Publication Data
US 2018/0301721 A1 Oct. 18, 2018

(30) Foreign Application Priority Data

Apr. 12, 2017 (JP) .................................. 2017-078816

(51) Int. Cl.
*H01M 8/04223* (2016.01)
*H01M 8/04089* (2016.01)
*H01M 8/04119* (2016.01)
*H01M 8/0432* (2016.01)
*H01M 8/04029* (2016.01)
*H01M 8/04082* (2016.01)
(Continued)

(52) U.S. Cl.
CPC ... *H01M 8/04253* (2013.01); *H01M 8/04029* (2013.01); *H01M 8/04097* (2013.01); *H01M 8/04134* (2013.01); *H01M 8/04164* (2013.01); *H01M 8/04179* (2013.01); *H01M 8/04201* (2013.01); *H01M 8/04231* (2013.01); *H01M 8/04328* (2013.01); *H01M 8/04343* (2013.01); *H01M 8/04358* (2013.01); *H01M 8/04373* (2013.01); *H01M 8/2475* (2013.01); *H01M 2008/1095* (2013.01)

(58) Field of Classification Search
None
See application file for complete search history.

(56) References Cited

U.S. PATENT DOCUMENTS

2008/0044691 A1 2/2008 Wake et al.
2008/0280174 A1 11/2008 Ogawa et al.
2010/0255394 A1 10/2010 Wake et al.

FOREIGN PATENT DOCUMENTS

JP 2010-244778 10/2010

OTHER PUBLICATIONS

The Extended European Search Report dated Sep. 11, 2018 for the related European Patent Application No. 18163045.0.

*Primary Examiner* — Wojciech Haske
(74) *Attorney, Agent, or Firm* — McDermott Will & Emery LLP

(57) ABSTRACT

A fuel cell system includes a fuel cell which generates electric power by using a hydrogen gas and an oxidizing gas, a hydrogen gas supply route where the hydrogen gas to be supplied to an anode of the fuel cell flows, an anode off-gas discharge route for discharging an anode off-gas discharged from the anode of the fuel cell to outside, an anode off-gas discharge valve provided to the anode off-gas discharge route, and a controller which causes the anode off-gas discharge valve to be opened when a temperature of any of the hydrogen gas supply route, the anode of the fuel cell, the anode off-gas discharge route, and the anode off-gas discharge valve becomes equal to or lower than a predetermined temperature.

6 Claims, 11 Drawing Sheets

(51) Int. Cl.
*H01M 8/1018* (2016.01)
*H01M 8/2475* (2016.01)

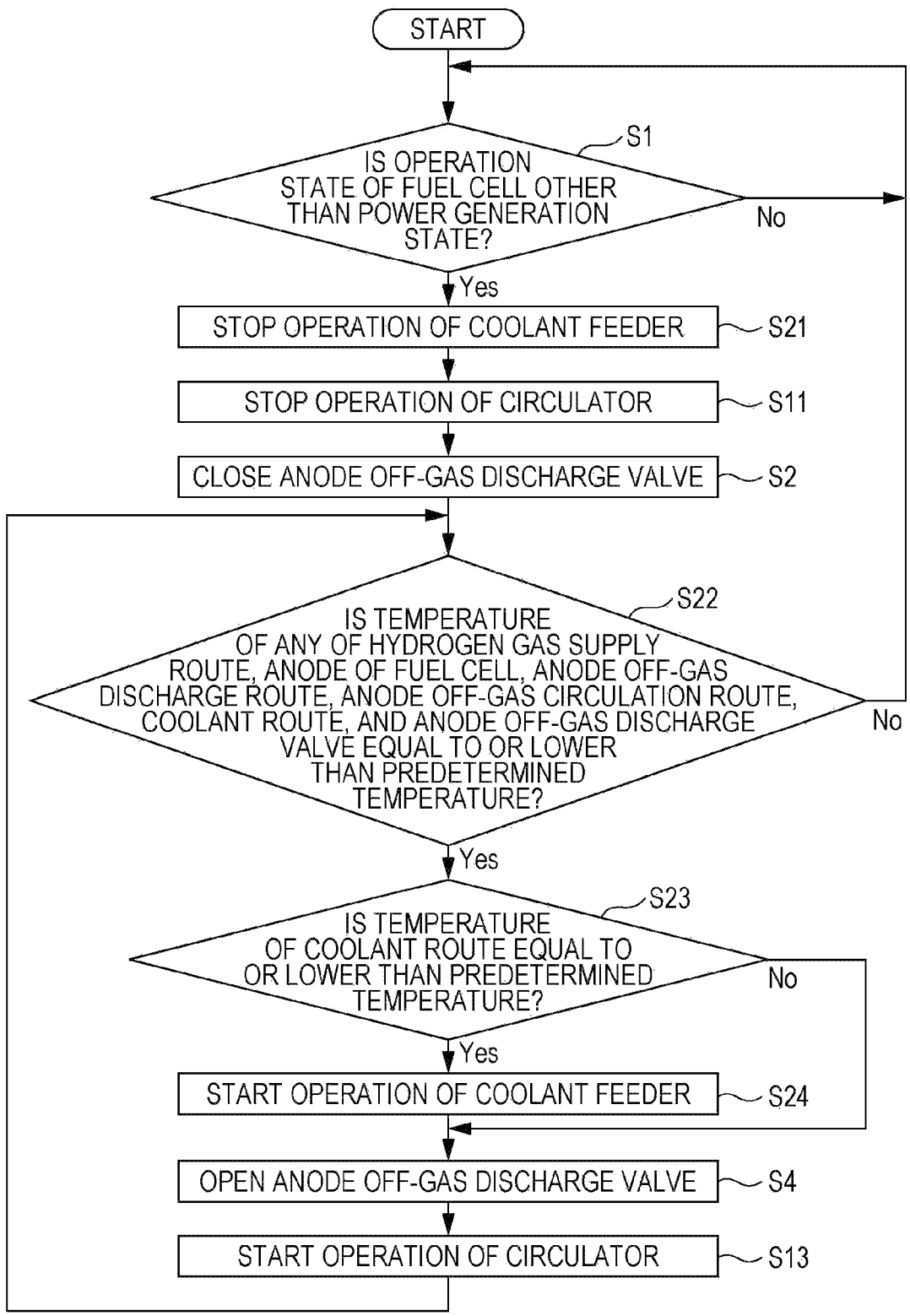

FUEL CELL SYSTEM

BACKGROUND

1. Technical Field

The present disclosure relates to a fuel cell system.

2. Description of the Related Art

With electrochemical reaction between hydrogen and oxygen, a solid polymer fuel cell generates electric power. In fuel cell systems of this type, various schemes have been suggested to improve power generation efficiency of a fuel cell by reducing the amount of supply of hydrogen.

For example, in a dead-end fuel cell system, the anode exit of the fuel cell is sealed, and hydrogen only in an amount required for power generation in the fuel cell is supplied, thereby reducing the amount of supply of hydrogen. Also, a recycle-type fuel cell system is structured so that, of a hydrogen gas supplied to the anode of the fuel cell, an anode off-gas not used for power generation in the fuel cell is returned to the anode of the fuel cell for reuse (recycling).

However, in the above-described fuel cell systems, a route extending from the anode exit of the fuel cell has a closed-circuit structure. Thus, for example, a nitrogen gas in an oxidizing gas flowing through the cathode of the fuel cell may be mixed into a hydrogen gas flowing through the anode of the fuel cell via an electrolyte membrane of the fuel cell. This decreases the concentration of hydrogen in the hydrogen gas, and thus makes power generation in the fuel cell unstable.

To recover the concentration of hydrogen in the hydrogen gas, a method is taken in which a purge valve communicating with a route extending from the anode exit of the fuel cell is provided and a gas is exhausted outside from the above route at an appropriate time during operation of the fuel cell system.

However, for example, the purge valve may be frozen when the fuel cell system is placed under a low-temperature environment after power generation in the fuel cell stops. In this case, the purge valve may not be normally opened and closed in the next operation of the fuel cell system.

Thus, a fuel cell system including a purge valve and a drain valve has been suggested in Japanese Unexamined Patent Application Publication No. 2010-244778. Specifically, the purge valve is closed and the drain valve is opened by purge operation on a hydrogen gas route and an anode off-gas route after power generation in the fuel cell stops. Then, together with a gas introduced to the anode off-gas route, water in a route between the anode off-gas route and the purge valve is discharged outside from the drain valve. This keeps a state in which water does not accumulate in the purge valve, and can inhibit freezing of the purge valve under a low-temperature environment.

SUMMARY

However, the related art does not disclose prevention of freezing of a device in which one anode off-gas discharge valve serves a purge function and a drain function in a fuel cell system.

One non-limiting and exemplary embodiment provides a fuel cell system capable of appropriately preventing freezing of an anode off-gas discharge valve including a purge function and a drain function.

In one general aspect, the techniques disclosed here feature a fuel cell system including a fuel cell which generates electric power by using a hydrogen gas and an oxidizing gas, a hydrogen gas supply route through which the hydrogen gas to be supplied to an anode of the fuel cell flows, an anode off-gas discharge route for discharging an anode off-gas discharged from the anode of the fuel cell to outside, an anode off-gas discharge valve provided to the anode off-gas discharge route, and a controller which causes the anode off-gas discharge valve to be opened when a temperature of any of the hydrogen gas supply route, the anode of the fuel cell, the anode off-gas discharge route, and the anode off-gas discharge valve becomes equal to or lower than a predetermined temperature.

The fuel cell system according to one aspect of the present disclosure has an effect capable of appropriately preventing freezing of an anode off-gas discharge valve including a purge function and a drain function.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a flowchart of one example of operation of the fuel cell system of the third embodiment.

DETAILED DESCRIPTION

Figure 1:
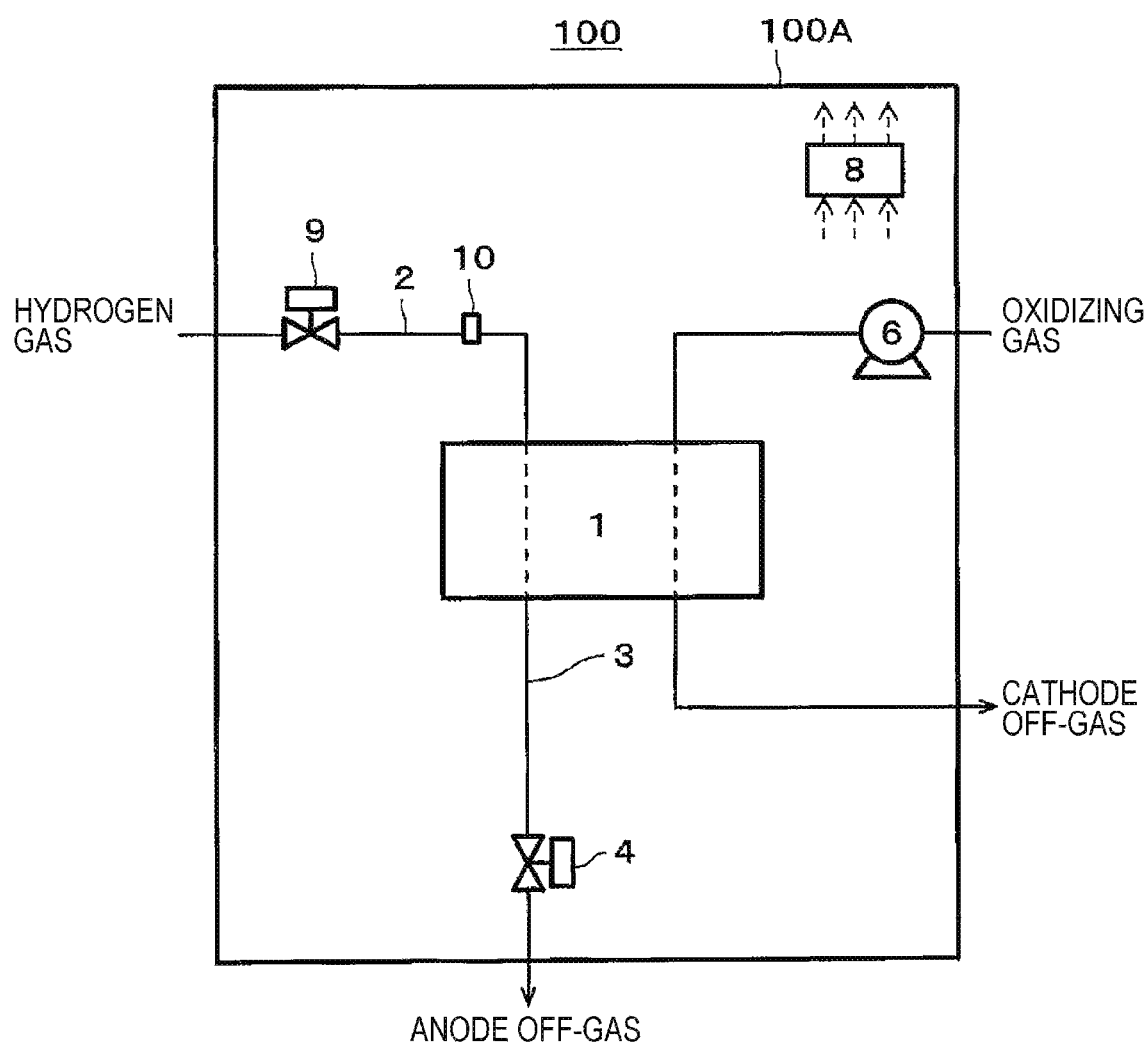
FIG. 1 is a diagram of one example of a fuel cell system of a first embodiment.

Prevention of freezing of a device in which one anode off-gas discharge valve serves a purge function and a drain function in a fuel cell system has been diligently studied, and the following knowledge has been acquired.

The technique disclosed in Japanese Unexamined Patent Application Publication No. 2010-244778 requires a purge valve and a drain valve, and thus still has a room for improvement to simplify the fuel cell system and reduce cost. That is, while the fuel cell system disclosed in Japanese Unexamined Patent Application Publication No. 2010-244778 includes a purge valve and a drain valve separately, the inventors have found that a device can be structured so that one anode off-gas discharge valve serves a purge function and a drain function in a fuel cell system. The consideration made in the disclosure described in Japanese Unexamined Patent Application Publication No. 2010-244778 is not able to prevent freezing of the device in which one anode off-gas discharge valve serves a purge function and a drain function in the fuel cell system.

Thus, a fuel cell system of a first aspect of the present disclosure has been derived based on the above described knowledge, and includes a fuel cell which generates electric power by using a hydrogen gas and an oxidizing gas, a hydrogen gas supply route through which the hydrogen gas to be supplied to an anode of the fuel cell flows, an anode off-gas discharge route for discharging an anode off-gas discharged from the anode of the fuel cell to outside, an anode off-gas discharge valve provided to the anode off-gas discharge route, and a controller which causes the anode off-gas discharge valve to be opened when a temperature of any of the hydrogen gas supply route, the anode of the fuel cell, the anode off-gas discharge route, and the anode off-gas discharge valve becomes equal to or lower than a predetermined temperature.

According to this structure, the fuel cell system of the present aspect can appropriately prevent freezing of the anode off-gas discharge valve including a purge function and a drain function. That is, the timing of the freezing prevention operation of opening the anode off-gas discharge valve is determined based on the temperature of any of the hydrogen gas supply route, the anode of the fuel cell, the anode off-gas discharge route, and the anode off-gas discharge valve. Then, when the temperature of any of the above becomes equal to or lower than the predetermined temperature, for example, the condensate in the anode off-gas discharge valve and its communicating route is appropriately drained before starting coagulating. Thus, freezing of the anode off-gas discharge valve is appropriately prevented and, in turn, the possibility that the anode off-gas discharge valve is not normally opened and closed can be reduced in the operation of the fuel cell system at the next time. Also, when the temperature of any of the above becomes equal to or lower than the predetermined temperature, for example, the condensate in the hydrogen gas supply route, the anode of the fuel cell, the anode off-gas discharge route, and so forth is appropriately drained before starting coagulating. Thus, the possibility of freezing damage of the hydrogen gas supply route, the anode of the fuel cell, the anode off-gas discharge route, and so forth by volume expansion due to freezing of the condensate can also be reduced.

A fuel cell system of a second aspect of the present disclosure may further include, in the fuel cell system of the first aspect, a gas-liquid separation tank provided to the anode off-gas discharge route extending upward from the anode off-gas discharge valve.

According to this structure, the condensate occurring inside the hydrogen gas supply route, the anode of the fuel cell, the anode off-gas discharge route, and so forth can be collected in the gas-liquid separation tank. Thus, the inside of these has no condensate, and tends to become in a gas-filled state. The fuel cell system of the present aspect thus can reduce the possibility of occurrence of freezing damage of the hydrogen gas supply route, the anode of the fuel cell, the anode off-gas discharge route, and so forth by volume expansion due to freezing of a condensate if present inside of these.

A fuel cell system of a third aspect of the present disclosure may further include, in the fuel cell system of the first aspect or the second aspect, an anode off-gas circulation route for sending the anode off-gas from the anode off-gas discharge route to the hydrogen gas supply route, and an anode off-gas circulator provided to the anode off-gas circulation route to circulate the anode off-gas. The controller may cause the anode off-gas circulator to operate and may cause the anode off-gas discharge valve to be opened when a temperature of any of the hydrogen gas supply route, the anode of the fuel cell, the anode off-gas discharge route, the anode off-gas discharge valve, and the anode off-gas circulation route becomes equal to or lower than a predetermined temperature.

According to this structure, in the recycle-type fuel cell system, when the temperature of any of the above becomes equal to or lower than a predetermined temperature, the anode off-gas discharge valve is opened, and the anode off-gas circulator operates. This causes the condensate occurring in the anode off-gas circulation route to be discharged outside through the anode off-gas discharge valve. Thus, freezing of the anode off-gas discharge valve can be appropriately prevented, and the possibility of occurrence of freezing damage of the anode off-gas circulation route by volume expansion due to condensate freezing can be reduced. Also, the condensate occurring in the hydrogen gas supply route, the anode of the fuel cell, and the anode off-gas discharge route is discharged outside through the anode off-gas discharge valve, and thus the possibility of occurrence of freezing damage of these by volume expansion due to condensate freezing can also be reduced.

A fuel cell system of a fourth aspect of the present disclosure may further include, in the fuel cell system of the first aspect or the second aspect, an anode off-gas circulation route for sending the anode off-gas from the anode off-gas discharge route to the hydrogen gas supply route, an anode off-gas circulator provided to the anode off-gas circulation route to circulate the anode off-gas, a coolant route through which a coolant to be supplied to the fuel cell flows, a coolant feeder provided to the coolant route to supply the coolant to the fuel cell, and a humidifier provided to the coolant route and the hydrogen gas supply route to humidify the hydrogen gas by using the coolant. The controller may cause the coolant feeder and the anode off-gas circulator to operate and may cause the anode off-gas discharge valve to be opened when a temperature of the coolant route becomes equal to or lower than a predetermined temperature.

According to this structure, in the recycle-type fuel cell system, when the temperature of the coolant route becomes equal to or lower than the predetermined temperature, the coolant feeder is caused to operate, forming a state in which the coolant circulates inside the coolant route. This allows prevention of freezing of the coolant route. Here, there is a possibility that water moves (transmits) from the coolant route to the hydrogen gas supply route through the humidifier. For example, in the state in which the coolant circulates inside the coolant route, a difference between a partial water vapor pressure (water vapor pressure) in the coolant route and a partial water vapor pressure in the hydrogen gas supply route tends to occur in the humidifier, and water thus tends to move from the coolant route to the hydrogen gas supply route through the humidifier.

Thus, in the fuel cell system of the present aspect, the anode off-gas discharge valve is opened, and the anode off-gas circulator operates, thereby causing water transmitted through the above humidifier to be discharged outside through the anode off-gas discharge valve. This can appropriately prevent freezing of the anode off-gas discharge valve. Also, the possibility of occurrence of freezing damage of the hydrogen gas supply route by volume expansion due to water freezing can be reduced.

In a fuel cell system of a fifth aspect of the present disclosure, in the fuel cell system of the fourth aspect, the controller may cause the anode off-gas circulator to operate and may cause the anode off-gas discharge valve to be opened when a temperature of any of the hydrogen gas supply route, the anode of the fuel cell, the anode off-gas discharge route, the anode off-gas discharge valve, and the anode off-gas circulation route becomes equal to or lower than a predetermined temperature.

According to this structure, in the recycle-type fuel cell system, even if the temperature of the coolant route exceeds the predetermined temperature, when the temperature of any of the hydrogen gas supply route, the anode of the fuel cell, the anode off-gas discharge route, the anode off-gas discharge valve, and the anode off-gas circulation route becomes equal to or lower than the predetermined temperature, the anode off-gas discharge valve is caused to be opened and the anode off-gas circulator is caused to operate, thereby causing the condensate occurring at the above-described portion to be discharged outside through the anode off-gas discharge valve. This can appropriately prevent freezing of the anode off-gas discharge valve and also reduce the possibility of occurrence of freezing damage of the hydrogen gas supply route, the anode of the fuel cell, the anode off-gas discharge route, and the anode off-gas circulation route by volume expansion due to condensate freezing.

A fuel cell system of a sixth aspect of the present disclosure may further include, in the fuel cell system of any one of the first to fifth aspects, a hydrogen gas supply valve provided to the hydrogen gas supply route. The controller may cause the hydrogen gas supply valve to be opened in operation of opening the anode off-gas discharge valve.

According to this structure, in freezing prevention operation of opening the anode off-gas discharge valve, the hydrogen gas supply valve is opened. This allows the hydrogen gas to be pumped by the supplier pressure of the hydrogen gas supply source into the hydrogen gas supply route of the fuel cell system, thereby appropriately draining the condensate in the hydrogen gas supply route, the anode of the fuel cell, the anode off-gas discharge route, the anode off-gas discharge valve, and so forth. Thus, compared with a system in which the hydrogen gas supply valve is not opened, the fuel cell system of the present aspect can more appropriately prevent freezing of the anode off-gas discharge valve in the above freezing prevention operation. Also, compared with the system in which the hydrogen gas supply valve is not opened, the fuel cell system of the present aspect can more reduce the possibility of the occurrence of freezing damage of the hydrogen gas supply route, the anode of the fuel cell, the anode off-gas discharge route, and so forth by volume expansion due to condensate freezing.

A fuel cell system of a seventh aspect of the present disclosure may further include, in the fuel cell system of any one of the first to sixth aspects, a housing that contains the fuel cell system, and a temperature detector provided inside the housing of the fuel cell system. The controller may cause the anode off-gas discharge valve to be opened when a temperature detected by the temperature detector is equal to or lower than the predetermined temperature.

According to this structure, the timing of the freezing prevention operation of opening the anode off-gas discharge valve can be appropriately determined based on the temperature detected by the temperature detector provided inside the housing of the fuel cell system.

A fuel cell system of an eighth aspect of the present disclosure includes a fuel cell which generates electric power by using a hydrogen gas and an oxidizing gas, a hydrogen gas supply route where the hydrogen gas to be supplied to an anode of the fuel cell flows, an anode off-gas discharge route for discharging an anode off-gas discharged from the anode of the fuel cell to outside, an anode off-gas discharge valve provided to the anode off-gas discharge route, a gas-liquid separation tank provided to the anode off-gas discharge route extending upward from the anode off-gas discharge valve, an anode off-gas circulation route for sending the anode off-gas from the anode off-gas discharge route to the hydrogen gas supply route, an anode off-gas circulator provided to the anode off-gas circulation route to circulate the anode off-gas, a coolant route where a coolant to be supplied to the fuel cell flows, a coolant feeder provided to the coolant route to supply the coolant to the fuel cell, a humidifier provided to the coolant route and the hydrogen gas supply route to humidify the hydrogen gas by using the coolant, and a controller. The controller causes the coolant feeder and the anode off-gas circulator to operate and causes the anode off-gas discharge valve to be opened when a temperature of any of the hydrogen gas supply route, the anode of the fuel cell, the anode off-gas discharge route, the anode off-gas circulation route, the coolant route, and the anode off-gas discharge valve becomes equal to or lower than a predetermined temperature and the temperature of the coolant route becomes equal to or lower than a predetermined temperature.

In the following, embodiments of the present disclosure are described with reference to the attached drawings. The embodiments described below each describe one example of the above-described aspects.

Thus, the numerical values, shapes, materials, components, arrangement positions and topology of the components, and so forth described below are merely examples and are not meant to limit each of the above aspects unless specified in the claims. Also, among the components described below, those not described in the independent claim indicating the most superordinate concept of the aspects are described as any components. Furthermore, redundant description of components with the same reference character in the drawings may be omitted. For easy understanding of the drawings, each component is schematically depicted, and the shape, scale ratio, and so forth may not be accurate.

First Embodiment

[Device Structure]

FIG. 1 is a diagram of one example of a fuel cell system of a first embodiment.

In the example depicted in FIG. 1, a fuel cell system 100 of the present embodiment includes a fuel cell 1, a hydrogen gas supply route 2, an anode off-gas discharge route 3, an anode off-gas discharge valve 4, an oxidizing gas feeder 6, a hydrogen gas supply valve 9, a controller 8, and a first temperature detector 10.

The fuel cell 1 generates electric power by using a hydrogen gas and an oxidizing gas. Specifically, hydrogen and oxygen are subjected to electrochemical reaction for power generation.

The fuel cell 1 includes, for example, a fuel cell stack of a membrane electrode assembly (MEA) having an electrolyte (not depicted in the drawing) interposed between an anode and a cathode. The anode and the cathode (electrodes) are each configured of a catalyst layer formed of carbon particles supporting a precious metal catalyst such as platinum and a gas diffusion layer formed of carbon paper and carbon felt, for example, although not limited thereto.

The fuel cell 1 may be of any type. In the fuel cell system 100 of the present embodiment, a polymer electrolyte fuel cell (PEFC) is exemplarily described as the fuel cell 1, although not limited thereto.

The hydrogen gas supply route 2 is a channel through which the hydrogen gas to be supplied to the anode of the fuel cell 1 flows. For example, a hydrogen gas generated by a water electrolyzer or the like not depicted may be used. That is, in the fuel cell system 100 of the present embodiment, the hydrogen gas is supplied from a hydrogen gas supply source not depicted in the drawing to the anode of the fuel cell 1. The hydrogen gas supply source has a predetermined supplier pressure. For example, a hydrogen gas infrastructure, hydrogen gas cylinder, or the like can be used. Since the hydrogen gas is a combustible gas, the hydrogen gas supply route 2 is formed of, for example, a pipe made of an incombustible material (for example, a metal pipe such as a stainless-steel-made pipe) or the like. The flow rate of the hydrogen gas supplied through the hydrogen gas supply route 2 is adjusted as appropriate in accordance with the amount of power generation in the fuel cell 1.

The hydrogen gas supply valve 9 is provided to the hydrogen gas supply route 2. That is, when the hydrogen gas supply valve 9 is opened, the supplier pressure of the hydrogen gas supply source not depicted in the drawing provides a predetermined supply pressure for supplying the hydrogen gas to the hydrogen gas supply route 2. As the hydrogen gas supply valve 9, for example, a solenoid electromagnetic valve or the like can be used.

The anode off-gas discharge route 3 is a channel for discharging an anode off-gas discharged from the anode of the fuel cell 1 to the outside. The anode off-gas discharge valve 4 is provided to the anode off-gas discharge route 3. In the fuel cell system 100 of the present embodiment, the anode off-gas discharge valve 4 is connected to the anode off-gas discharge route 3 extending downward from the anode exit of the fuel cell 1. Thus, when the anode off-gas discharge valve 4 is opened, an unreacted hydrogen gas not used for power generation in the fuel cell 1 is discharged outside as an anode off-gas through the anode off-gas discharge route 3.

Since the anode off-gas contains a combustible gas, the anode off-gas discharge route 3 is formed of a pipe made of an incombustible material (for example, a metal pipe such as a stainless-steel-made pipe) or the like. As the anode off-gas discharge valve 4, for example, a solenoid electromagnetic valve or the like can be used.

The oxidizing gas feeder 6 is a device which supplies an oxidizing gas to the cathode of the fuel cell 1. As the oxidizing gas, for example, air can be used. In this case, as the oxidizing gas feeder 6, for example, a compressor, electromagnetic-induction-type diaphragm pump, or the like can be used. A route where the oxidizing gas and a cathode off-gas circulate is formed of, for example, a metal pipe such as a stainless-steel-made pipe, crosslinked polyethylene tube, or the like.

The controller 8 causes the anode off-gas discharge valve 4 to be opened (hereinafter, freezing prevention operation) when the temperature of any of the hydrogen gas supply route 2, the anode of the fuel cell 1, the anode off-gas discharge route 3, and the anode off-gas discharge valve 4 becomes equal to or lower than a predetermined temperature. The predetermined temperature may be set, for example, within 1-5° C. For example, as depicted in FIG. 1, the fuel cell system 100 may include the first temperature detector 10 provided inside a housing 100A of the fuel cell system 100, and the controller 8 may perform the freezing prevention operation when the temperature detected by the first temperature detector 10 is equal to or lower than a predetermined temperature. Also, the controller 8 may perform the freezing prevention operation based on appropriate temperature information correlated with the temperature of any of the anode of the fuel cell 1, the anode off-gas discharge route 3, and the anode off-gas discharge valve 4 and transmitted from outside via a network or the like. As the first temperature detector 10, for example, a thermistor or the like can be used.

Figure 3:
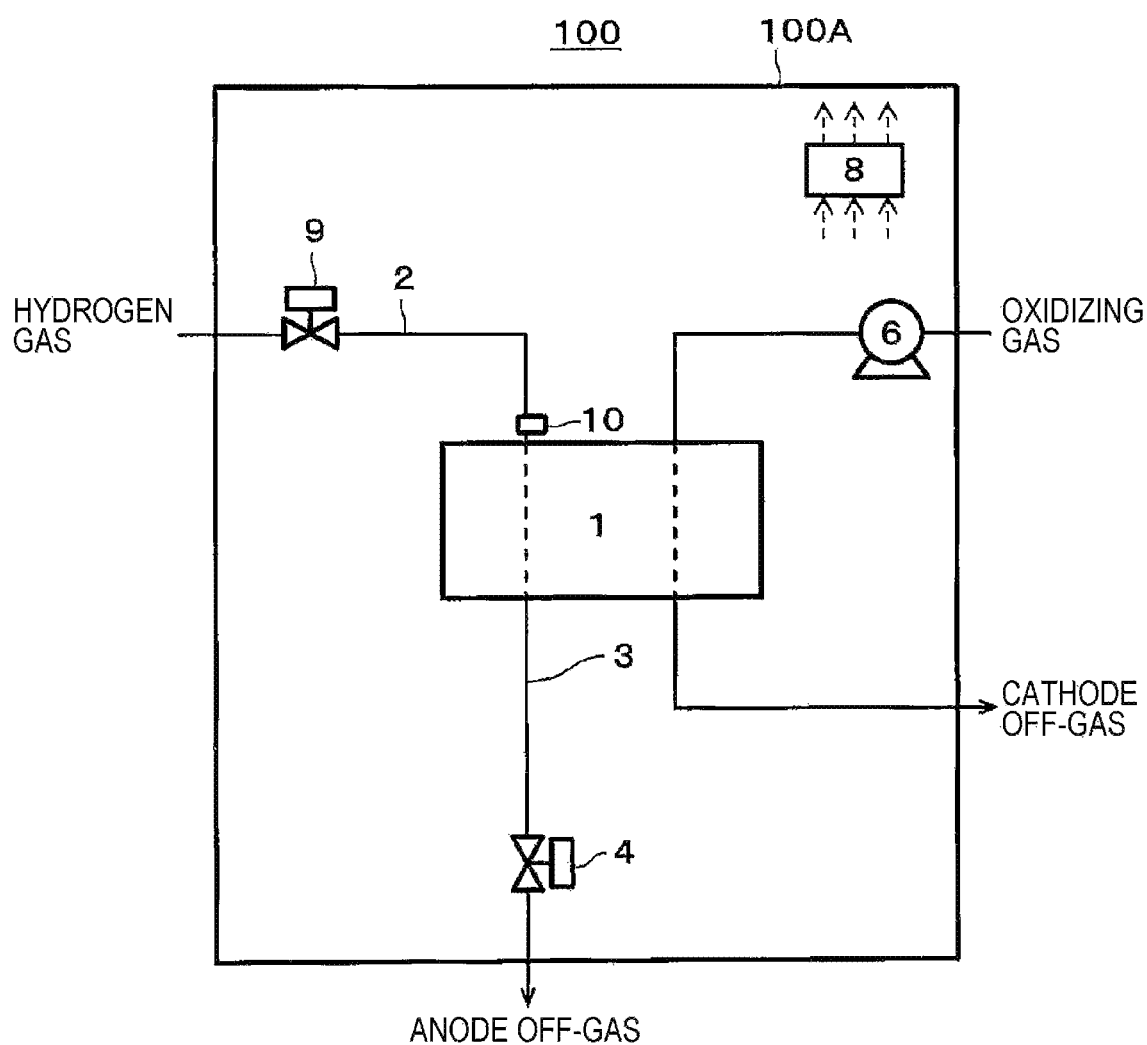
FIG. 3 is a diagram of one example of a fuel cell system of a first embodiment.
Figure 4:
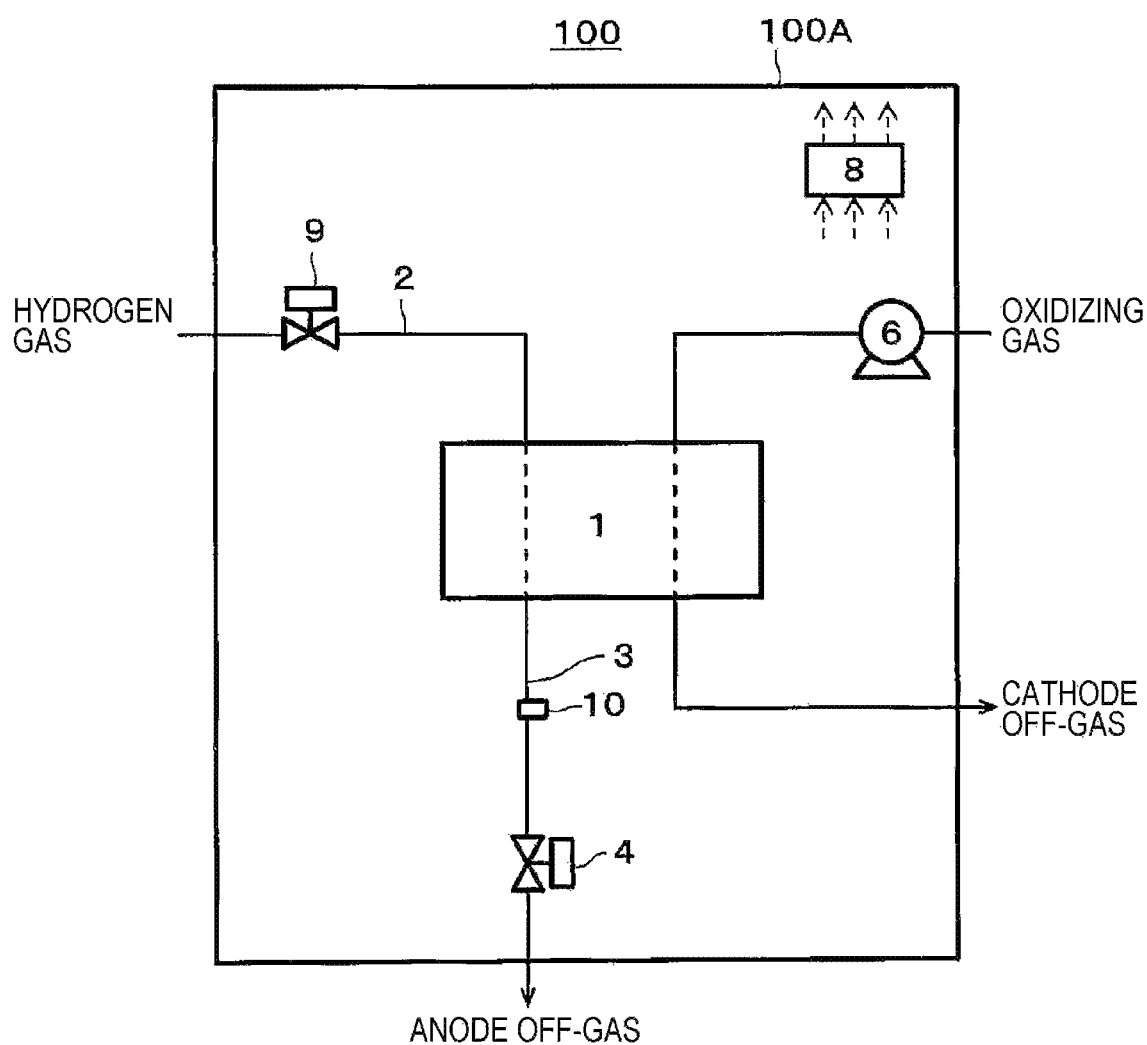
FIG. 4 is a diagram of one example of a fuel cell system of a first embodiment.
Figure 5:
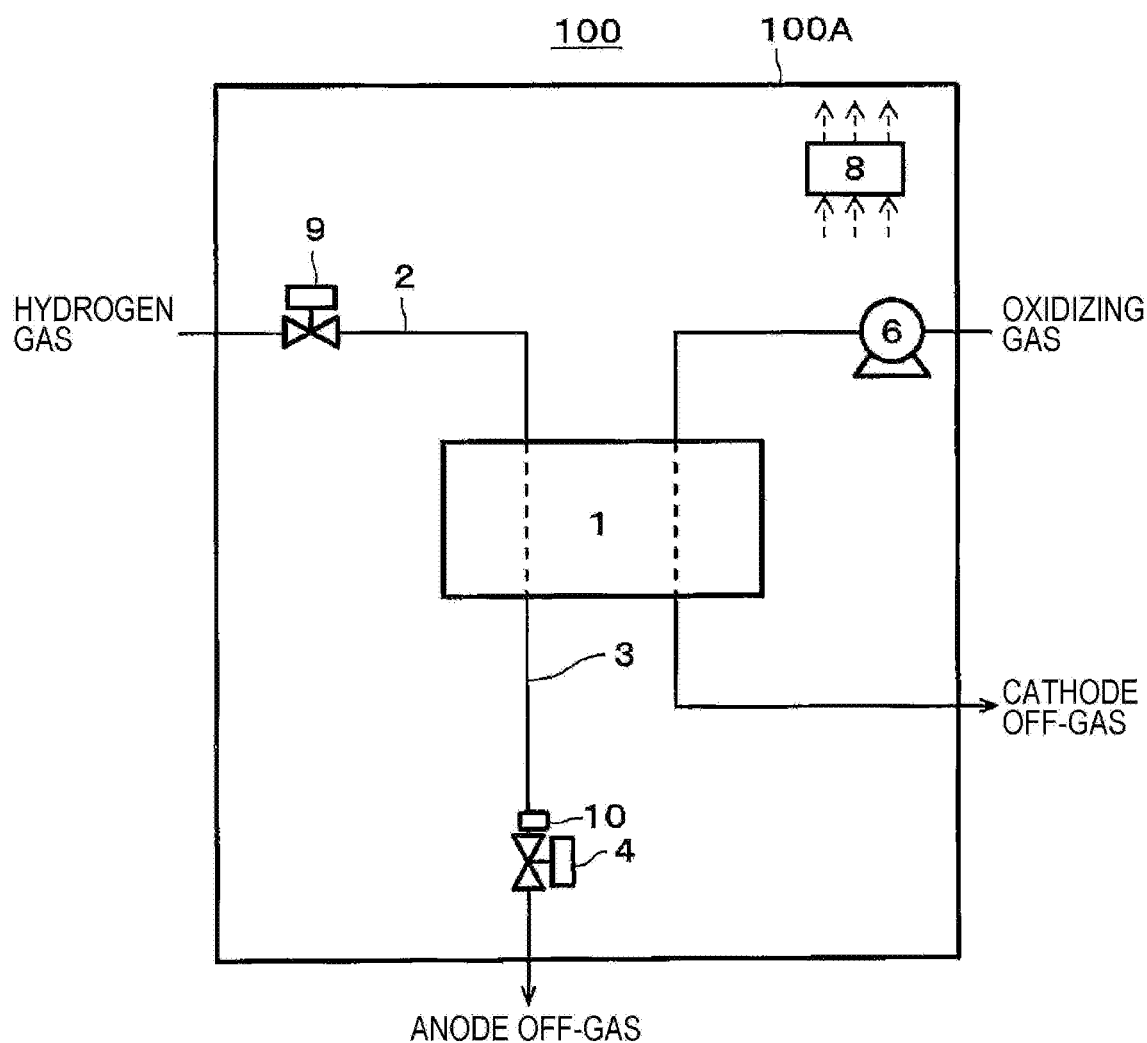
FIG. 5 is a diagram of one example of a fuel cell system of a first embodiment.

Only one first temperature detector 10 may be provided at an appropriate location inside the housing 100A, or a plurality thereof may be provided inside the housing 100A. In the fuel cell system 100 of the present embodiment, the first temperature detector 10 is provided to the hydrogen gas supply route 2, although not limited thereto. As depicted in FIG. 3, the first temperature detector 10 may be provided near the anode of the fuel cell 1, and may detect a temperature of the anode of the fuel cell 1. As depicted in FIG. 4, the first temperature detector 10 may be provided to the anode off-gas discharge route 3, and may detect a temperature of the anode off-gas discharge route 3. As depicted in FIG. 5, the first temperature detector 10 may be provided to near the anode off-gas discharge valve 4, and may detect a temperature of the anode off-gas discharge valve 4. The first sensor 10 may detects a temperature of any of the hydrogen gas supply route 2, the anode of the fuel cell 1, the anode off-gas discharge route 3, and the anode off-gas discharge valve 4.

The controller 8 may have any structure with a control function. The controller 8 includes, for example, an arithmetic operation circuit and a storage circuit which stores a control program. As the arithmetic operation circuit, for example, an MPU, CPU, or the like can be used. As the storage circuit, for example, a memory can be used. The controller 8 may be structured of a single controller for centralized control or a plurality of controllers for distributed control in cooperation with each other.

[Operation]

Figure 2:
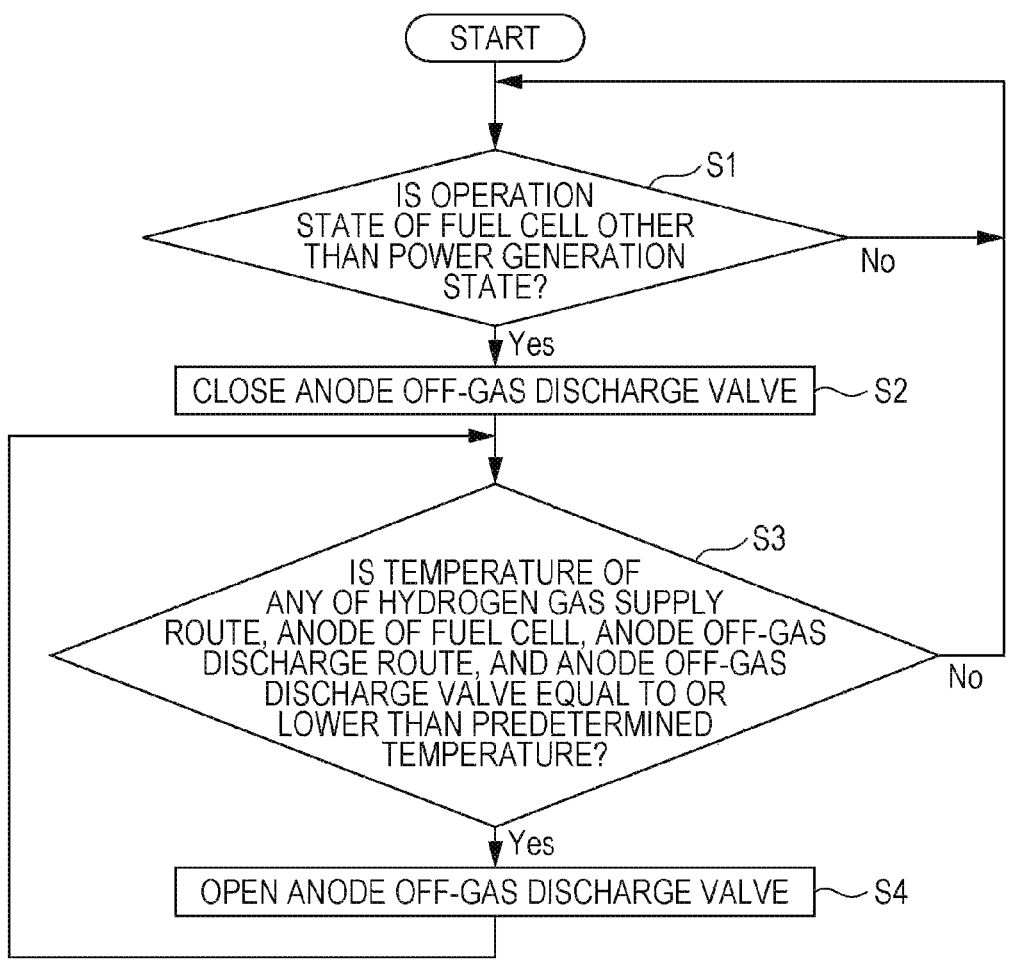
FIG. 2 is a flowchart of one example of operation of the fuel cell system of the first embodiment.

FIG. 2 is a flowchart of one example of operation of the fuel cell system of the first embodiment.

The operation described below is performed by, for example, the arithmetic operation circuit of the controller 8 reading the control program from the storage circuit. However, the operation described below may not be performed by the controller 8 but may be partially performed by an operator. Also, in the operation described below, the sequence of steps or the like can be changed as occasion demands. Also, another known step can be added as occasion demands.

First at step S1, it is determined whether the operation state of the fuel cell 1 is other than a power generation state.

At step S1, what is meant by that the operation state of the fuel cell 1 is other than a power generation state is that the fuel cell 1 does not generate electric power. For example, the fuel cell system 100 is during a stop sequence or a start sequence or is waiting between these sequences.

When the operation state of the fuel cell 1 is determined to be a power generation state (No at step S1), the operation temperature of the fuel cell system 100 is sufficiently higher than a temperature at which water starts to coagulate (water coagulation point), and thus the freezing prevention operation of the fuel cell system 100 described below is not performed. Thus, in this case, the determination operation at step S1 is repeated. Here, at an appropriate time during power generation in the fuel cell 1, the anode off-gas discharge valve 4 is opened, and an unreacted hydrogen gas not used for power generation in the fuel cell 1 is discharged outside as an anode off-gas through the anode off-gas discharge route 3.

When the operation state of the fuel cell 1 is determined to be other than a power generation state (Yes at step S1), a decrease in temperature of the fuel cell system 100 occurs, and there is a possibility that the temperature of the fuel cell system 100 approaches the water coagulation point. Thus, in this case, the operation at step S2 onward is performed.

That is, when the operation state of the fuel cell 1 is determined to be other than a power generation state (Yes at step S1), the anode off-gas discharge valve 4 is closed (step S2). If the anode off-gas discharge valve 4 is closed immediately before the start of operation at step S2, it is confirmed at step S2 that the anode off-gas discharge valve has been closed.

Next at step S3, it is determined whether the temperature of any of the hydrogen gas supply route 2, the anode of the fuel cell 1, the anode off-gas discharge route 3, and the anode off-gas discharge valve 4 is equal to or lower than a predetermined temperature. The predetermined temperature at step S3 is set to be higher than the water coagulation point.

For example, when the first temperature detector 10 detects a temperature inside the housing 100A of the fuel cell system 100 (for example, a space temperature), the predetermined temperature at step S3 may be set at approximately 3° C. There is a possibility of temperature differences among the hydrogen gas supply route 2, the anode of the fuel cell 1, the anode off-gas discharge route 3, and the anode off-gas discharge valve 4 due to an influence of an air flow in the housing 100A. Of the hydrogen gas supply route 2, the anode of the fuel cell 1, the anode off-gas discharge route 3, and the anode off-gas discharge valve 4, the first temperature detector 10 is preferably provided near a portion where water freezing tends to occur most. This setting of the predetermined temperature is merely an example and is not limited to this example.

When the temperatures of all of the hydrogen gas supply route 2, the anode of the fuel cell 1, the anode off-gas discharge route 3, and the anode off-gas discharge valve 4 are determined at step S3 to exceed the predetermined temperature (No at step S3), the freezing prevention operation of the fuel cell system 100 is not performed. Thus, in this case, the process returns to step S1 to repeat the determination operation at step S1.

When the temperature of any of the hydrogen gas supply route 2, the anode of the fuel cell 1, the anode off-gas discharge route 3, and the anode off-gas discharge valve 4 is determined at step S3 to be equal to or lower than the predetermined temperature (Yes at step S3), if a condensate is present at a location where the temperature is equal to or lower than the predetermined temperature among the components of the fuel cell system 100, there is a possibility that the condensate starts coagulating. Thus, in this case, the process proceeds to the next step S4.

At step S4, the anode off-gas discharge valve 4 is opened. For example, when the temperature detected by the first temperature detector 10 is equal to or lower than the predetermined temperature, the operation of opening the anode off-gas discharge valve 4 at step S4 may be performed. In this operation of opening the anode off-gas discharge valve 4 (step S4), the hydrogen gas supply valve 9 may be opened, although not depicted in the drawing.

Then at step S3, the determination operation at step S3 is performed again.

As described above, the fuel cell system 100 of the present embodiment can appropriately prevent freezing of the anode off-gas discharge valve 4 including a purge function and a drain function. That is, the timing of the freezing prevention operation of opening the anode off-gas discharge valve 4 is determined based on the temperature of any of the hydrogen gas supply route 2, the anode of the fuel cell 1, the anode off-gas discharge route 3, and the anode off-gas discharge valve 4. Then, for example, when the temperature of any of the above becomes equal to or lower than the predetermined temperature, the condensate in the anode off-gas discharge valve 4 and its communicating route is appropriately drained before starting coagulating. Thus, freezing of the anode off-gas discharge valve 4 is appropriately prevented and, in turn, the possibility that the anode off-gas discharge valve 4 is not normally opened and closed can be reduced in the operation of the fuel cell system 100 at the next time. Also, for example, when the temperature of any of the above becomes equal to or lower than the predetermined temperature, the condensate in the hydrogen gas supply route 2, the anode of the fuel cell 1, the anode off-gas discharge route 3, and so forth is appropriately drained before starting coagulating. Thus, the possibility of freezing damage of the hydrogen gas supply route 2, the anode of the fuel cell 1, the anode off-gas discharge route 3, and so forth by volume expansion due to freezing of the condensate can also be reduced.

Also, in the fuel cell system 100 of the present embodiment, the hydrogen gas supply valve 9 is opened in the operation of opening the anode off-gas discharge valve 4. This allows the hydrogen gas to be pumped by the supplier pressure of the hydrogen gas supply source into the hydrogen gas supply route 2 of the fuel cell system 100, thereby appropriately draining the condensate in the hydrogen gas supply route 2, the anode of the fuel cell 1, the anode off-gas discharge route 3, the anode off-gas discharge valve 4, and so forth. Thus, compared with a system in which the hydrogen gas supply valve 9 is not opened, the fuel cell system 100 of the present embodiment can more appropriately prevent freezing of the anode off-gas discharge valve 4 in the freezing prevention operation of opening the anode off-gas discharge valve 4. Also, compared with the system in which the hydrogen gas supply valve 9 is not opened, the fuel cell system 100 of the present embodiment can more reduce the possibility of the occurrence of freezing damage of the hydrogen gas supply route 2, the anode of the fuel cell 1, the anode off-gas discharge route 3, and so forth by volume expansion due to condensate freezing.

Also, the fuel cell system 100 of the present embodiment can appropriately determine the timing of the freezing prevention operation of opening the anode off-gas discharge valve 4 based on the temperature detected by the first temperature detector 10 provided inside the housing 100A of the fuel cell system 100.

Modification Example

Figure 6:
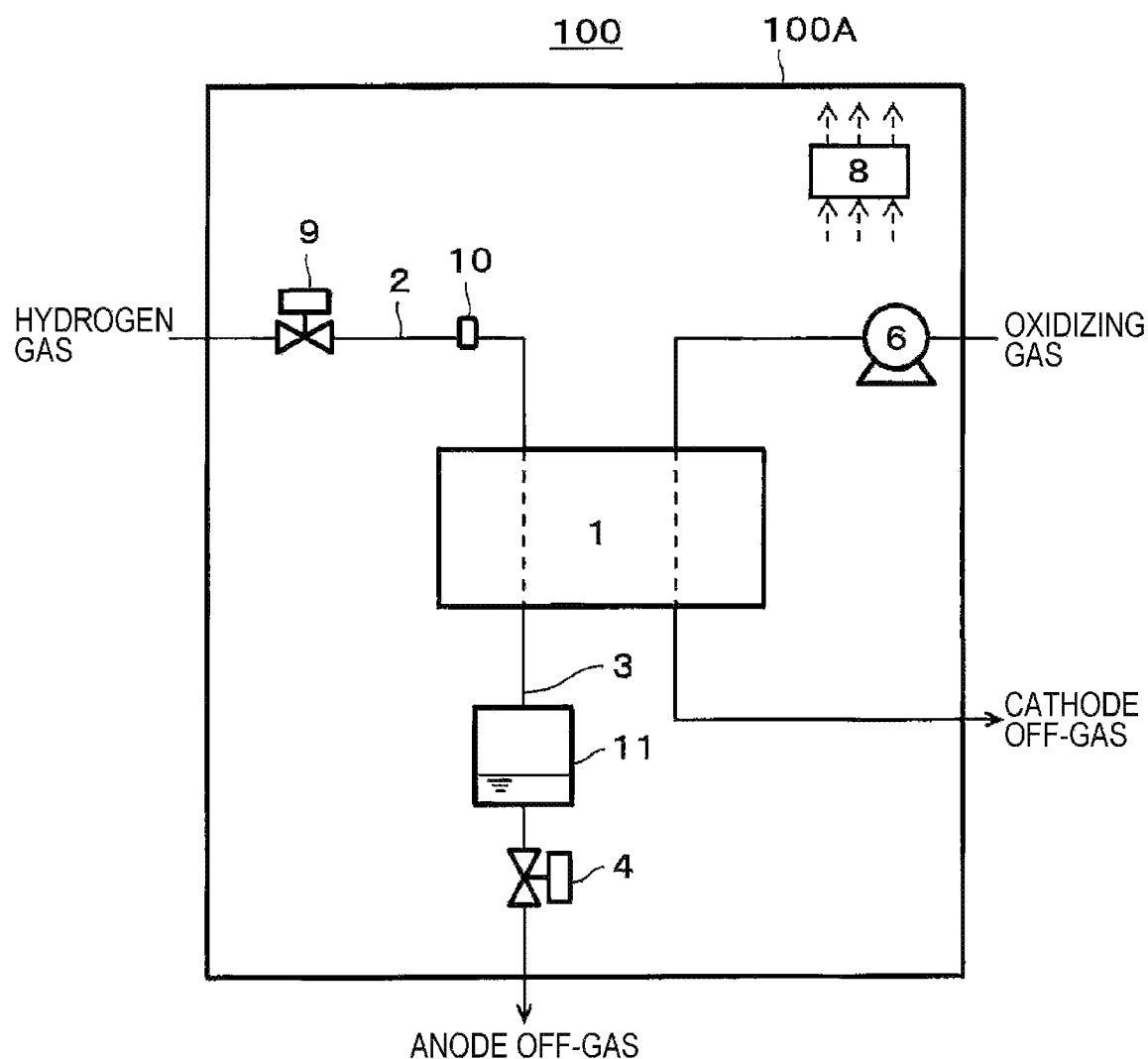
FIG. 6 is a diagram of one example of a fuel cell system of a modification example of the first embodiment.

FIG. 6 is a diagram of one example of a fuel cell system of a modification example of the first embodiment.

In the example depicted in FIG. 6, the fuel cell system 100 of the present modification example includes the fuel cell 1, the hydrogen gas supply route 2, the anode off-gas discharge route 3, the anode off-gas discharge valve 4, the oxidizing gas feeder 6, the hydrogen gas supply valve 9, the controller 8, the first temperature detector 10, and a gas-liquid separation tank 11.

The fuel cell 1, the hydrogen gas supply route 2, the anode off-gas discharge route 3, the anode off-gas discharge valve 4, the oxidizing gas feeder 6, the hydrogen gas supply valve 9, the controller 8, and the first temperature detector 10 are similar to those of the first embodiment, and are thus not described herein.

The gas-liquid separation tank 11 is provided to the anode off-gas discharge route 3 extending upward from the anode off-gas discharge valve 4. The gas-liquid separation tank 11 includes a water tank as depicted in FIG. 6. In this water tank, for example, a condensate occurring inside the hydrogen gas supply route 2, the anode of the fuel cell 1, the anode off-gas discharge route 3, and so forth can be collected. Thus, for example, the capacity of the water tank is set equal to or larger than the internal capacity from the hydrogen gas supply route 2 to the location of the anode off-gas discharge route 3 provided with the gas-liquid separation tank 11. As the water tank, for example, a stainless tank or the like can be used.

Except the above-described feature, the fuel cell system 100 of the present modification example may be structured similarly to the fuel cell system 100 of the first embodiment.

[Operation]

The operation of the fuel cell system 100 of the present modification example is similar to the operation of the fuel cell system 100 of the first embodiment, and is thus not depicted and described herein.

As described above, the fuel cell system 100 of the present modification example can collect the condensate occurring inside the hydrogen gas supply route 2, the anode of the fuel cell 1, the anode off-gas discharge route 3, and so forth in the gas-liquid separation tank 11. Thus, the inside of these has no condensate, and tends to become in a gas-filled state. The above-structured fuel cell system 100 of the present modification example thus can reduce the possibility of occurrence of freezing damage of the hydrogen gas supply route 2, the anode of the fuel cell 1, the anode off-gas discharge route 3, and so forth by volume expansion due to freezing of a condensate if present inside of these.

Second Embodiment

[Device Structure]

Figure 7:
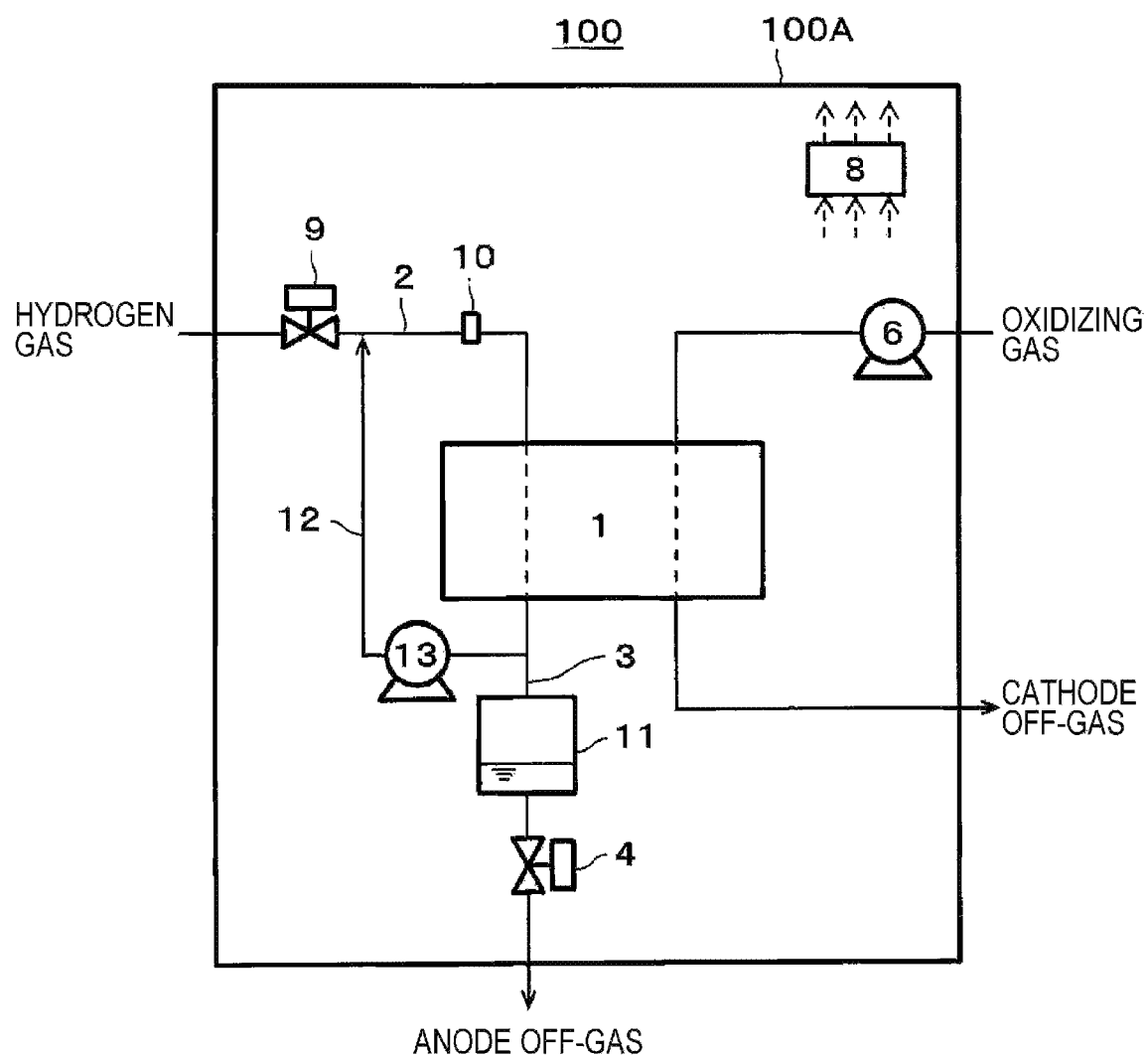
FIG. 7 is a diagram of one example of a fuel cell system of a second embodiment.

FIG. 7 is a diagram of one example of a fuel cell system of a second embodiment.

In the example depicted in FIG. 7, the fuel cell system 100 of the present embodiment includes the fuel cell 1, the hydrogen gas supply route 2, the anode off-gas discharge route 3, the anode off-gas discharge valve 4, the oxidizing gas feeder 6, the hydrogen gas supply valve 9, the controller 8, the first temperature detector 10, the gas-liquid separation tank 11, an anode off-gas circulation route 12, and an anode off-gas circulator 13.

The fuel cell 1, the hydrogen gas supply route 2, the anode off-gas discharge route 3, the anode off-gas discharge valve 4, the oxidizing gas feeder 6, the hydrogen gas supply valve 9, and the first temperature detector 10 are similar to those of the first embodiment, and are thus not described herein.

The anode off-gas circulation route 12 is a channel for sending an anode off-gas from the anode off-gas discharge route 3 to the hydrogen gas supply route 2. A downstream end of the anode off-gas circulation route 12 may be connected to any location on a channel where a hydrogen gas flows. In the fuel cell system 100 of the present embodiment, the downstream end of the anode off-gas circulation route 12 is connected to the hydrogen gas supply route 2 extending between the hydrogen gas supply valve 9 and the anode entrance of the fuel cell 1. An upstream end of the anode off-gas circulation route 12 is connected to, for example, the anode off-gas discharge route 3 extending between the anode exit of the fuel cell 1 and the gas-liquid separation tank 11. With this structure, water and gas in the anode off-gas exiting from the anode exit of the fuel cell 1 are separated by the gas-liquid separation tank 11. Since the anode off-gas contains a combustible gas, the anode off-gas circulation route 12 is formed of a pipe made of an incombustible material (for example, a metal pipe such as a stainless-steel-made pipe) or the like.

The anode off-gas circulator 13 is a device provided to the anode off-gas circulation route 12 to circulate the anode off-gas. The anode off-gas circulator 13 may have any structure so as to be able to circulate the anode off-gas. In FIG. 7, as the anode off-gas circulator 13, a booster provided to the anode off-gas circulation route 12 is depicted. As the booster, for example, an electromagnetic-induction-type diaphragm pump capable of adjusting the flow rate of the anode off-gas by an input voltage from the controller 8 can be used. Although not depicted in the drawing, the anode off-gas circulator may be an ejector provided at a location connecting the anode off-gas circulation route 12 and the hydrogen gas supply route 2.

The controller 8 causes the anode off-gas circulator 13 to operate and causes the anode off-gas discharge valve 4 to be opened (hereinafter, freezing prevention operation) when the temperature of any of the hydrogen gas supply route 2, the anode of the fuel cell 1, the anode off-gas discharge route 3, the anode off-gas discharge valve 4, and the anode off-gas circulation route 12 becomes equal to or lower than a predetermined temperature. For example, the controller 8 may perform the freezing prevention operation when the temperature detected by the above-described first temperature detector 10 is equal to or lower than a predetermined temperature. Also, the controller 8 may perform the freezing prevention operation based on appropriate temperature information correlated with the temperature of any of the anode of the fuel cell 1, the anode off-gas discharge route 3, and the anode off-gas discharge valve 4 and transmitted from outside via a network or the like.

Figure 8:
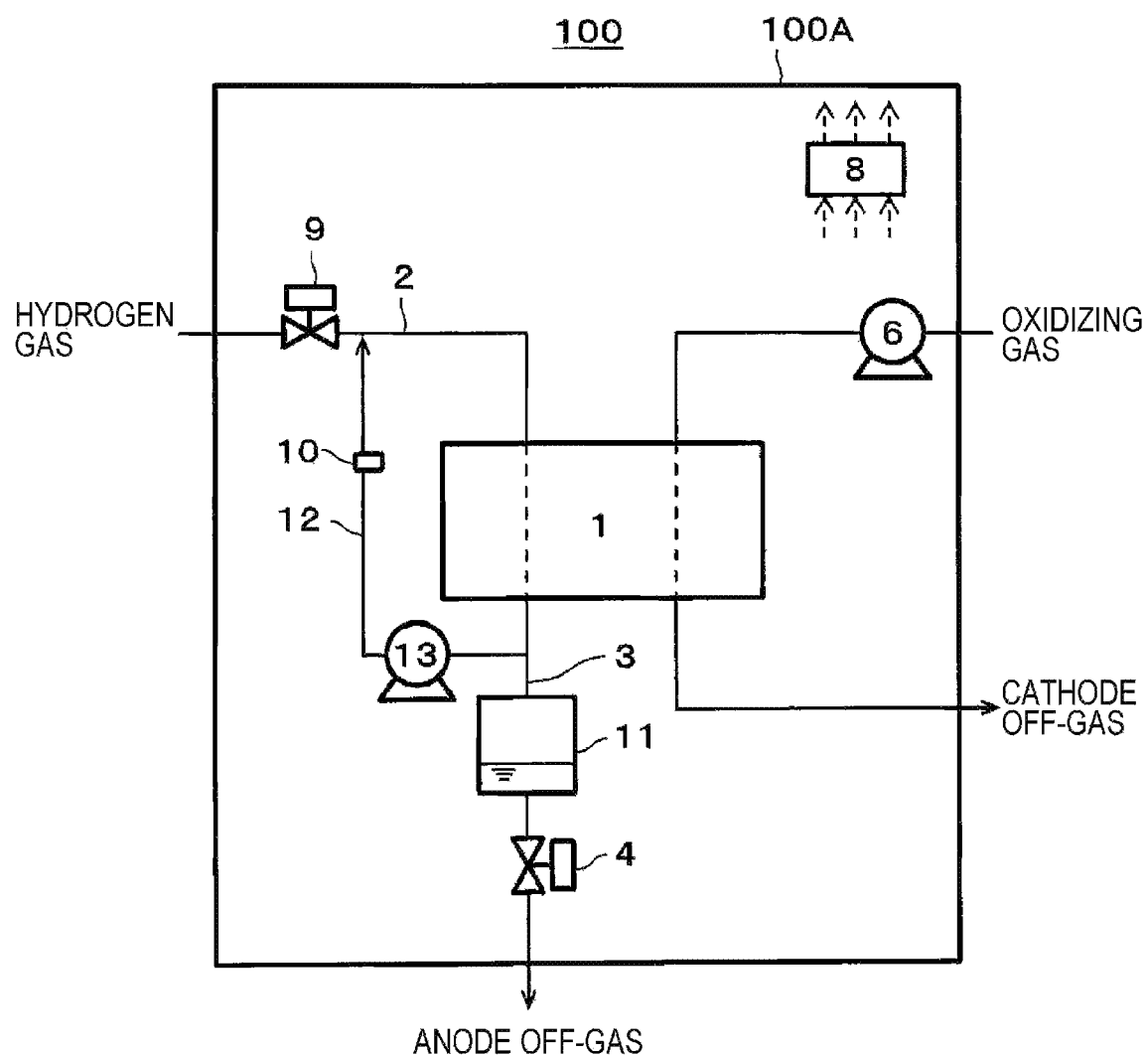
FIG. 8 is a diagram of one example of a fuel cell system of a second embodiment.

As depicted in FIG. 8, the first temperature detector 10 may be provided to the anode off-gas circulation route 12, and may detect a temperature of the anode off-gas circulation route 12. The first sensor 10 may detect a temperature of any of the hydrogen gas supply route 2, the anode of the fuel cell 1, the anode off-gas discharge route 3, the anode off-gas discharge valve 4, and the anode off-gas circulation route 12.

The controller 8 may have any structure having a control function, as described above.

Except the above-described feature, the fuel cell system 100 of the present embodiment may be structured similarly to the fuel cell system 100 of any of the first embodiment and the modification example of the first embodiment.

[Operation]

Figure 9:
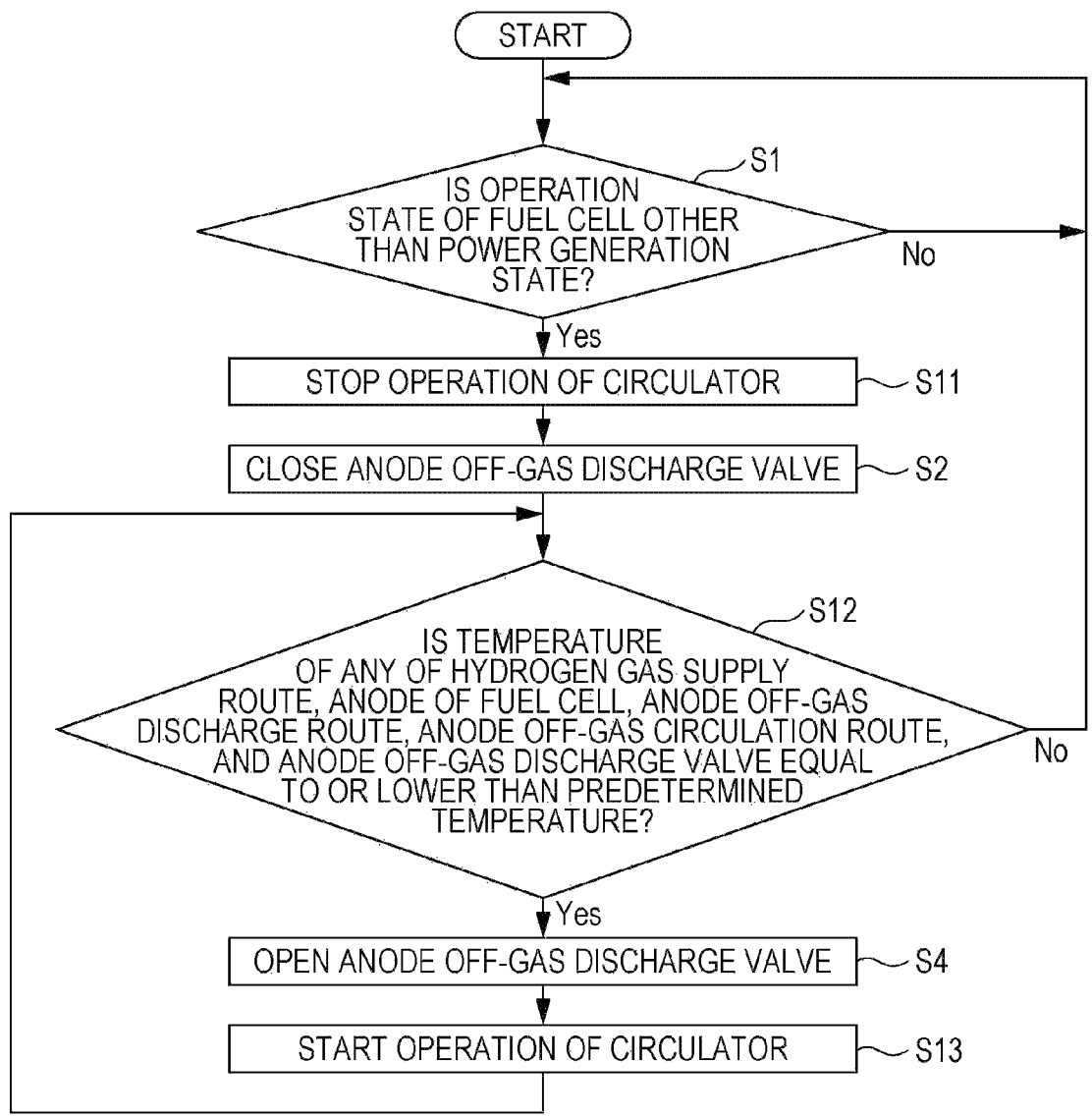
FIG. 9 is a flowchart of one example of operation of the fuel cell system of the second embodiment.

FIG. 9 is a flowchart of one example of operation of the fuel cell system of the second embodiment.

The operation described below is performed by, for example, the arithmetic operation circuit of the controller 8 reading the control program from the storage circuit. However, the operation described below may not be performed by the controller 8 but may be partially performed by an operator. Also, in the operation described below, the sequence of steps or the like can be changed as occasion demands. Also, another known step can be added as occasion demands.

Here, step S1, step S2, and step S4 in FIG. 9 are similar to step S1, step S2, and step S4 in FIG. 2, and are thus not described in detail herein.

In the recycle-type fuel cell system 100 of FIG. 7, when the operation state of the fuel cell 1 is a power generation state, of the hydrogen gas supplied to the anode of the fuel cell 1, an anode off-gas not used for power generation in the fuel cell 1 is returned to the anode of the fuel cell 1 for reuse (recycling). In the course of circulation of the anode off-gas, impurities other than the hydrogen gas increases with time in the anode off-gas. The impurities include, for example, a nitrogen gas leaking from the cathode of the fuel cell 1 to the anode thereof through an electrolyte membrane. When the impurities in the anode off-gas increase, the concentration of hydrogen in the anode off-gas decreases. Thus, during power generation in the fuel cell 1, by temporarily opening the anode off-gas discharge valve 4 at an appropriate time, the anode off-gas containing the impurities is released (purged) to the outside together with the condensate inside the gas-liquid separation tank 11. This allows a reduction in concentration of the impurities in the anode off-gas and recovery of the concentration of hydrogen in the anode off-gas.

First, when the operation state of the fuel cell 1 is other than a power generation state (Yes at step S1), the operation of the anode off-gas circulator 13 is stopped (step S11). If the operation of the anode off-gas circulator 13 is stopped immediately before the start of operation at step S11, it is confirmed at step S11 that the operation of the anode off-gas circulator 13 has been stopped.

Next at step S12, it is determined whether the temperature of any of the hydrogen gas supply route 2, the anode of the fuel cell 1, the anode off-gas discharge route 3, the anode off-gas circulation route 12, and the anode off-gas discharge valve 4 is equal to or lower than a predetermined temperature. The predetermined temperature at step S12 is set to be higher than the water coagulation point.

For example, when the first temperature detector 10 detects a temperature inside the housing 100A of the fuel cell system 100 (for example, a space temperature), the predetermined temperature at step S12 may be set at approximately 3° C. In this case, as described above, of the hydrogen gas supply route 2, the anode of the fuel cell 1, the anode off-gas discharge route 3, the anode off-gas circulation route 12, and the anode off-gas discharge valve 4, the first temperature detector 10 is preferably provided near a portion where water freezing tends to occur most. This setting of the predetermined temperature is merely an example and is not limited to this example.

When the temperatures of all of the hydrogen gas supply route 2, the anode of the fuel cell 1, the anode off-gas discharge route 3, the anode off-gas circulation route 12, and the anode off-gas discharge valve 4 are determined at step S12 to exceed the predetermined temperature (No at step S12), the freezing prevention operation of the fuel cell system 100 is not performed. Thus, in this case, the process returns to step S1 to repeat the determination operation at step S1.

When the temperature of any of the hydrogen gas supply route 2, the anode of the fuel cell 1, the anode off-gas discharge route 3, the anode off-gas circulation route 12, and the anode off-gas discharge valve 4 is determined at step S12 to be equal to or lower than the predetermined temperature (Yes at step S12), if a condensate is present at a location where the temperature is equal to or lower than the predetermined temperature among the components of the fuel cell system 100, there is a possibility that the condensate starts coagulating. Thus, in this case, the process proceeds to the next step S4.

Then, after the anode off-gas discharge valve 4 is opened at step S4, the anode off-gas circulator 13 starts operating at step S13. For example, the anode off-gas discharge valve 4 may be opened at step S4 and the anode off-gas circulator 13 may start operating at step S13 when the temperature detected by the first temperature detector 10 is equal to or lower than the predetermined temperature. In this operation of opening the anode off-gas discharge valve 4 (step S4), the hydrogen gas supply valve 9 may be opened, although not depicted in the drawing.

Then at step S12, the determination operation at step S12 is performed again.

Except the above-described feature, the operation of the fuel cell system 100 of the present embodiment may be similar to the operation of the fuel cell system 100 of the first embodiment.

As described above, in the fuel cell system 100 of the present embodiment, when the temperature of any of the hydrogen gas supply route 2, the anode of the fuel cell 1, the anode off-gas discharge route 3, the anode off-gas discharge valve 4, and the anode off-gas circulation route 12 becomes equal to or lower than a predetermined temperature, the anode off-gas discharge valve 4 is opened, and the anode off-gas circulator 13 operates. This causes the condensate occurring in the anode off-gas circulation route 12 to be discharged outside through the anode off-gas discharge valve 4. Thus, freezing of the anode off-gas discharge valve 4 can be appropriately prevented, and the possibility of occurrence of freezing damage of the anode off-gas circulation route 12 by volume expansion due to condensate freezing can be reduced. Also, the condensate occurring in the hydrogen gas supply route 2, the anode of the fuel cell 1, and the anode off-gas discharge route 3 is discharged outside through the anode off-gas discharge valve 4, and thus the possibility of occurrence of freezing damage of these by volume expansion due to condensate freezing can also be reduced.

Third Embodiment

[Device Structure]

Figure 10:
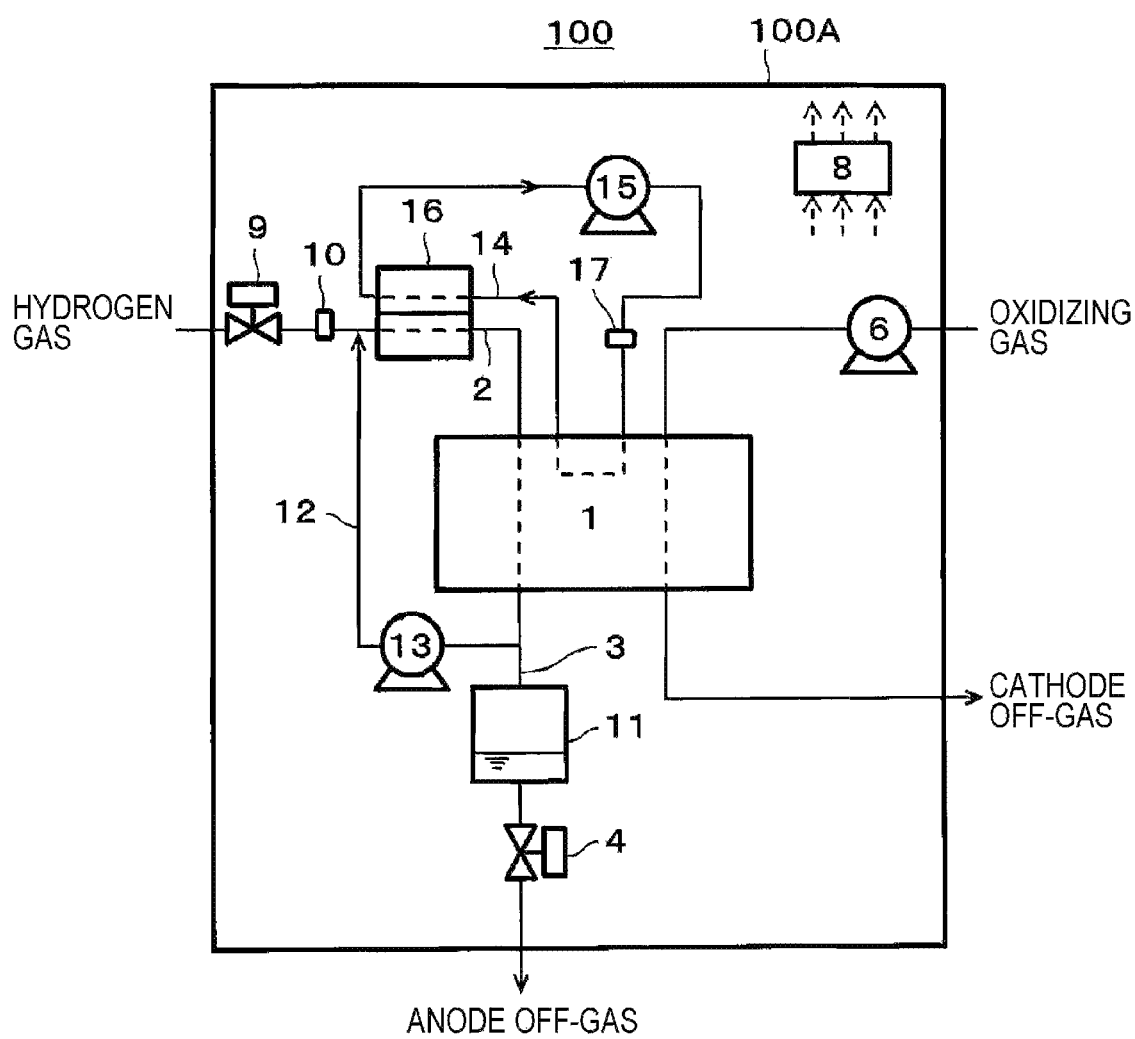
FIG. 10 is a diagram of one example of a fuel cell system of a third embodiment.

FIG. 10 is a diagram of one example of a fuel cell system of a third embodiment.

In the example depicted in FIG. 10, the fuel cell system 100 of the present embodiment includes the fuel cell 1, the hydrogen gas supply route 2, the anode off-gas discharge route 3, the anode off-gas discharge valve 4, the oxidizing gas feeder 6, the hydrogen gas supply valve 9, the controller 8, the first temperature detector 10, the gas-liquid separation tank 11, the anode off-gas circulation route 12, the anode off-gas circulator 13, a coolant route 14, a coolant feeder 15, a humidifier 16, and a second temperature detector 17.

The fuel cell 1, the hydrogen gas supply route 2, the anode off-gas discharge route 3, the anode off-gas discharge valve 4, the oxidizing gas feeder 6, the hydrogen gas supply valve 9, and the first temperature detector 10 are similar to those of the first embodiment, and are thus not described herein. Also, the gas-liquid separation tank 11 is similar to the one described in the modification example of the first embodiment, and is thus not described herein. Furthermore, the anode off-gas circulation route 12 and the anode off-gas circulator 13 are similar to those of the second embodiment, and are thus not described herein.

A coolant route 14 is a channel where a coolant to be supplied to the fuel cell 1 flows. That is, through the coolant route 14, the coolant for collecting heat generated at the time of power generation in the fuel cell 1 by heat exchange is circulating. A device to keep the temperature of the fuel cell 1 at an appropriate temperature during power generation in the fuel cell 1 is provided as appropriate. For example, the coolant route 14 of the fuel cell system 100 of the present embodiment is provided with the coolant feeder 15, the second temperature detector 17, the fuel cell 1, and the humidifier 16 are provided in this sequence in a coolant flow direction.

The coolant feeder 15 is a device provided to the coolant route 14 to supply the coolant to the fuel cell 1. The coolant feeder 15 may have any structure capable of supplying the coolant to the fuel cell 1. As the coolant feeder 15, for example, a rotary circulating pump is used.

Also, the second temperature detector 17 detects a temperature of the coolant before flowing into the fuel cell 1. As the second temperature detector 17, for example, a thermistor or the like can be used.

The humidifier 16 is a device provided to the coolant route 14 and the hydrogen gas supply route 2 to humidify the hydrogen gas by using the coolant. For example, the temperature of the coolant flowing through the coolant route 14 after flowing out from the fuel cell 1 is increased by collecting heat of the fuel cell 1. Thus, the hydrogen gas is humidified by heat exchange at the humidifier 16 between the coolant at high temperatures and the hydrogen gas at low temperatures flowing through the hydrogen gas supply route 2. As the humidifier 16, for example, a heat exchanger formed of a hollow fiber membrane made of ion exchange resin with a gas flowing inside and hot water flowing outside can be used.

Although not depicted in the drawing, a radiator may be provided at an appropriate location of the coolant route 14. With this, when the coolant heated by heat exchange with the fuel cell 1 passes through the radiator, the heat of the coolant is lost by heat dissipation, and the coolant is cooled. As the radiator, for example, an air-cooled heat exchanger including an air-blowing fan can be used.

With the above, for example, the controller 8 may perform feedback control of operations of the coolant feeder 15, the radiator, and so forth so that the water temperature of the coolant for heat exchange with the fuel cell 1 becomes a predetermined temperature. This keeps the temperature of the fuel cell 1 at an appropriate temperature.

Also, when the temperature of the coolant route 14 becomes equal to or lower than a predetermined temperature, the controller 8 causes the coolant feeder 15 and the anode off-gas circulator 13 to operate and causes the anode off-gas discharge valve 4 to be opened (hereinafter, freezing prevention operation). For example, the controller 8 may perform the freezing prevention operation when the temperature detected by the above-described second temperature detector 17 is equal to or lower than a predetermined temperature. Also, the controller 8 may perform the freezing prevention operation based on appropriate temperature information correlated with the temperature of the coolant route 14 and transmitted from outside via a network or the like.

Also, the controller 8 causes the anode off-gas circulator 13 to operate and causes the anode off-gas discharge valve 4 to be opened (hereinafter, freezing prevention operation) when the temperature of any of the hydrogen gas supply route 2, the anode of the fuel cell 1, the anode off-gas discharge route 3, the anode off-gas discharge valve 4, and the anode off-gas circulation route 12 becomes equal to or lower than a predetermined temperature. For example, the controller 8 may perform the freezing prevention operation when the temperature detected by the above-described first temperature detector 10 is equal to or lower than a predetermined temperature. Also, the controller 8 may perform the freezing prevention operation based on appropriate temperature information correlated with the temperature of any of the anode of the fuel cell 1, the anode off-gas discharge route 3, and the anode off-gas discharge valve 4 and transmitted from outside via a network or the like.

The controller 8 may have any structure having a control function, as described above.

Except the above-described feature, the fuel cell system 100 of the present embodiment may be structured similarly to any of the first embodiment, the modification example of the first embodiment, and the second embodiment.

[Operation]

FIG. 11 is a flowchart of one example of operation of the fuel cell system according to the third embodiment.

The operation described below is performed by, for example, the arithmetic operation circuit of the controller 8 reading the control program from the storage circuit. However, the operation described below may not be performed by the controller 8 but may be partially performed by an operator. Also, in the operation described below, the sequence of steps or the like can be changed as occasion demands. Also, another known step can be added as occasion demands.

Here, step S1, step S2, and step S4 in FIG. 11 are similar to step S1, step S2, and step S4 in FIG. 2, and are thus not described in detail herein. Also, step S11 and step S13 in FIG. 11 are similar to step S11 and step S13 in FIG. 9, and are thus not described in detail herein.

As with the fuel cell system 100 of the second embodiment, in the recycle-type fuel cell system 100 of FIG. 10, when the operation state of the fuel cell 1 is a power generation state, of the hydrogen gas supplied to the anode of the fuel cell 1, an anode off-gas not used for power generation in the fuel cell 1 is returned to the anode of the fuel cell 1 for reuse (recycling).

First, when the operation state of the fuel cell 1 is other than a power generation state (Yes at step S1), the operation of the coolant feeder 15 is stopped (step S21). If the operation of the coolant feeder 15 is stopped immediately before the start of operation at step S21, it is confirmed at step S21 that the operation of the coolant feeder 15 has been stopped.

Next at step S22, it is determined whether the temperature of any of the hydrogen gas supply route 2, the anode of the fuel cell 1, the anode off-gas discharge route 3, the anode off-gas circulation route 12, the coolant route 14, and the anode off-gas discharge valve 4 is equal to or lower than a predetermined temperature. The predetermined temperature at step S22 is set to be higher than the water coagulation point.

For example, when the first temperature detector 10 detects a temperature inside the housing 100A of the fuel cell system 100 (for example, a space temperature), the predetermined temperature at step S22 may be set at approximately 3° C. In this case, as described above, of the hydrogen gas supply route 2, the anode of the fuel cell 1, the anode off-gas discharge route 3, the anode off-gas circulation route 12, the coolant route 14, and the anode off-gas discharge valve 4, the first temperature detector 10 is preferably provided near a portion where water freezing tends to occur most. This setting of the predetermined temperature is merely an example and is not limited to this example.

When the temperatures of all of the hydrogen gas supply route 2, the anode of the fuel cell 1, the anode off-gas discharge route 3, the anode off-gas circulation route 12, the coolant route 14, and the anode off-gas discharge valve 4 are determined at step S22 to exceed the predetermined temperature (No at step S22), the freezing prevention operation of the fuel cell system 100 is not performed. Thus, in this case, the process returns to step S1 to repeat the determination operation at step S1.

When the temperature of any of the hydrogen gas supply route 2, the anode of the fuel cell 1, the anode off-gas discharge route 3, the anode off-gas circulation route 12, the coolant route 14, and the anode off-gas discharge valve 4 is determined at step S22 to be equal to or lower than the predetermined temperature (Yes at step S22), if a condensate is present at a location where the temperature is equal to or lower than the predetermined temperature among the components of the fuel cell system 100, there is a possibility that the condensate starts coagulating. Thus, in this case, the process proceeds to the next determination step S23.

Next at step S23, it is determined whether the temperature of the coolant route 14 is equal to or lower than a predetermined temperature. The predetermined temperature at step S23 may be equal to the predetermined temperature at step S22, and is set to be higher than the water coagulation point. For example, when the second temperature detector 17 detects a coolant temperature inside the coolant route 14, the predetermined temperature at step S23 may be set at approximately 3° C. This setting of the predetermined temperature is merely an example and is not limited to this example.

When it is determined at step S23 that the temperature of the coolant route 14 exceeds the predetermined temperature (No at step S23), the process directly proceeds to step S4.

When it is determined at step S23 that the temperature of the coolant route 14 is equal to or lower than the predetermined temperature (Yes at step S23), the coolant feeder 15 starts operating at step S24, and the process proceeds to step S4.

Then, after the anode off-gas discharge valve 4 is opened at step S4, the anode off-gas circulator 13 starts operating at step S13. In this operation of opening the anode off-gas discharge valve 4 (step S4), the hydrogen gas supply valve 9 may be opened, although not depicted in the drawing.

Then at step S22, the determination operation at step S22 is performed again.

Except the above-described feature, the operation of the fuel cell system 100 of the present embodiment may be similar to the operation of the fuel cell system 100 of the first embodiment or the second embodiment.

As described above, when the temperature of the coolant route 14 becomes equal to or lower than the predetermined temperature, the fuel cell system 100 of the present embodiment causes the coolant feeder 15 to operate, forming a state in which the coolant circulates inside the coolant route 14. This allows prevention of freezing of the coolant route 14. Here, there is a possibility that water moves (transmits) from the coolant route 14 to the hydrogen gas supply route 2 through the humidifier 16. For example, in the state in which the coolant circulates inside the coolant route 14, a difference between a partial water vapor pressure (water vapor pressure) in the coolant route 14 and a partial water vapor pressure in the hydrogen gas supply route 2 tends to occur in the humidifier 16, and water thus tends to move from the coolant route 14 to the hydrogen gas supply route 2 through the humidifier 16. Thus, in the fuel cell system 100 of the present embodiment, the anode off-gas discharge valve 4 is opened, and the anode off-gas circulator 13 operates, thereby causing water transmitted through the above humidifier 16 to be discharged outside through the anode off-gas discharge valve 4. This can appropriately prevent freezing of the anode off-gas discharge valve 4. Also, the possibility of occurrence of freezing damage of the hydrogen gas supply route 2 by volume expansion due to water freezing can be reduced.

Also, even if the temperature of the coolant route 14 exceeds the predetermined temperature, when the temperature of any of the hydrogen gas supply route 2, the anode of the fuel cell 1, the anode off-gas discharge route 3, the anode off-gas discharge valve 4, and the anode off-gas circulation route 12 becomes equal to or lower than the predetermined temperature, the fuel cell system 100 of the present embodiment causes the anode off-gas discharge valve 4 to be opened and causes the anode off-gas circulator 13 to operate, thereby causing the condensate occurring at the above-described portion to be discharged outside through the anode off-gas discharge valve 4. This can appropriately prevent freezing of the anode off-gas discharge valve 4 and also reduce the possibility of occurrence of freezing damage of the hydrogen gas supply route 2, the anode of the fuel cell 1, the anode off-gas discharge route 3, and the anode off-gas circulation route 12 by volume expansion due to condensate freezing.

The first embodiment, the modification example of the first embodiment, the second embodiment, and the third embodiment may be combined in a manner not excluding one another. For example, the recycle-type fuel cell system 100 may include the gas-liquid separation tank 11 as depicted in FIG. 7 and FIG. 10 or may not include a gas-liquid separation tank.

Also, from the above description, many improvements and other embodiments of the present disclosure are evident for a person skilled in the art. Thus, the above description is to be interpreted merely as an example, and is provided to teach a person skilled in the art the best mode to carry out the present disclosure. Details of the structure and/or functions of the present disclosure can be substantially modified without deviating from the spirit of the present disclosure.

One aspect of the present disclosure can be used for a fuel cell system capable of appropriately preventing freezing of an anode off-gas discharge valve including a purge function and a drain function.

What is claimed is:

1. A fuel cell system comprising:
a fuel cell which generates electric power by using a hydrogen gas and an oxidizing gas;
a hydrogen gas supply route through which the hydrogen gas to be supplied to an anode of the fuel cell flows;
an anode off-gas discharge route for discharging an anode off-gas discharged from the anode of the fuel cell to outside;
an anode off-gas discharge valve provided to the anode off-gas discharge route;
an anode off-gas circulation route for sending the anode off-gas from the anode off-gas discharge route to the hydrogen gas supply route;
an anode off-gas circulator provided to the anode off-gas circulation route to circulate the anode off-gas;
a coolant route through which a coolant to be supplied to the fuel cell flows;
a coolant feeder provided to the coolant route to supply the coolant to the fuel cell;

a humidifier provided to the coolant route and the hydrogen gas supply route to humidify the hydrogen gas by using the coolant; and a controller which causes the anode off-gas discharge valve to be opened when a temperature of any of the hydrogen gas supply route, the anode of the fuel cell, the anode off-gas discharge route, and the anode off-gas discharge valve becomes equal to or lower than a predetermined temperature, wherein the controller causes the coolant feeder and the anode off-gas circulator to operate and causes the node off-gas discharge valve to be opened, when a temperature of the coolant route becomes equal to or lower than a predetermined temperature.

2. The fuel cell system according to claim 1, further comprising:

a gas-liquid separation tank provided to the anode off-gas discharge route extending upward from the anode off-gas discharge valve.

3. The fuel cell system according to claim 1, further comprising:

an anode off-gas circulation route for sending the anode off-gas from the anode off-gas discharge route to the hydrogen gas supply route; and an anode off-gas circulator provided to the anode off-gas circulation route to circulate the anode off-gas, wherein the controller causes the anode off-gas circulator to operate and causes the anode off-gas discharge valve to be opened, when a temperature of any of the hydrogen gas supply route, the anode of the fuel cell, the anode off-gas discharge route, the anode off-gas discharge valve, and the anode off-gas circulation route becomes equal to or lower than a predetermined temperature.

4. The fuel cell system according to claim 1, wherein the controller causes the anode off-gas circulator to operate and causes the anode off-gas discharge valve to be opened, when a temperature of any of the hydrogen gas supply route, the anode of the fuel cell, the anode off-gas discharge route, the anode off-gas discharge valve, and the anode off-gas circulation route becomes equal to or lower than a predetermined temperature.

5. The fuel cell system according to claim 1, further comprising:

a hydrogen gas supply valve provided to the hydrogen gas supply route, wherein the controller causes the hydrogen gas supply valve to be opened in operation of opening the anode off-gas discharge valve.

6. The fuel cell system according to claim 1, further comprising:

a housing that contains the fuel cell system; and a temperature detector provided inside the housing of the fuel cell system, wherein the controller causes the anode off-gas discharge valve to be opened when a temperature detected by the temperature detector is equal to or lower than the predetermined temperature.

* * * * *